C. LOSKAMP.
RAISING AND TRANSPLANTING PLANTS.
No. 191,806. Patented June 12, 1877.
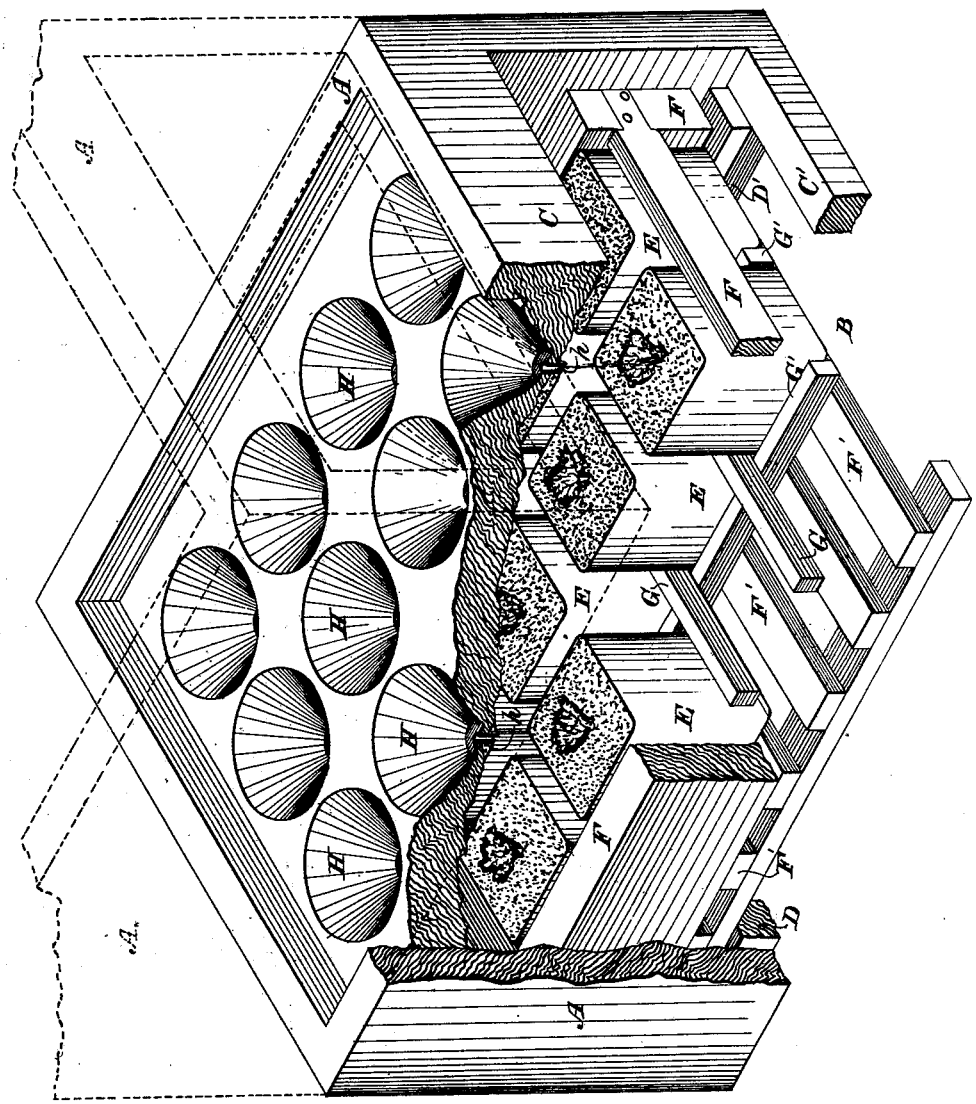
WITNESSES
INVENTOR
Conrad Loskamp
By his Attorneys.
N. PETERS, PHOTO-LITHOGRAPHER, WASHINGTON, D.C.

UNITED STATES PATENT OFFICE.

CONRAD LOSKAMP, OF EAST COLDENHAM, NEW YORK.

IMPROVEMENT IN RAISING AND TRANSPLANTING PLANTS.

Specification forming part of Letters Patent No. 191,806, dated June 12, 1877; application filed April 21, 1877.

*To all whom it may concern:*

Be it known that I, CONRAD LOSKAMP, of East Coldenham, in the county of Orange and State of New York, have invented certain new and useful Improvements in Raising and Transplanting Plants, of which the following is a specification:

The objects of my invention are to hasten the germination of seeds, roots, &c., to expedite the growth of plants therefrom, and to facilitate the handling and transplanting of the plants.

To these ends my improvements consist in setting, planting, or sowing roots, seeds, &c., in earth mixed with suitable fertilizing material contained in bags or similar receptacles composed of thin paper, and arranged under cover in such manner as to allow heated air to circulate about and between them, keeping the earth in the bags properly moist at and near the center and about the roots or seeds, while leaving its surrounding portion or walls and the paper covering dry, to prevent the rotting, disintegrating, or giving way of the paper, and finally transplanting or setting out the plants, with all the soil in which they were raised surrounding their roots, and the bags containing the plants and earth. In this way the paper, while holding together for handling and transporting the rich earth in which the growth of the plants was forced, and protecting it and the roots of the plants from immediate and too sudden contact with the comparatively cold soil of the garden or field to which the plants are transplanted, soon gives way and leaves the roots free to grow without obstruction.

My improvements further consist in the combination of a slotted or open-work rack for holding and keeping separate a series of paper bags or pots, an open-bottomed frame in which the rack is supported, and a water-supply, or series of receptacles by which water is supplied centrally to the top of the earth in each of the bags.

My improvements also consist in certain novel constructions of devices and combinations of parts hereinafter specifically designated.

In the accompanying drawing, which is a sectional perspective view, a frame or holder, A, is shown as having an open bottom, B, its two sides and one end closed, its front end open between the top and bottom rails C C', and as provided with bottom ways or ledges D D', upon which the rack for supporting the bags and earth slides in and out through the front opening. This frame A is made of any desired size and shape, and a series of them are arranged side by side, and one above another to any desired extent. The dotted lines represent a second frame in place above the first.

The thin paper bags E are arranged at slight distances apart to form passages around them for the circulation of air on all sides in a sliding rack, F, supported and movable in and out upon the ways D D' of the frame. The slats F', upon which the bags rest, allow the air to ascend around them to warm the earth within and keep the paper dry, while the cross-slats G and G' keep the bags apart and form air-circulating passages.

A series of water-holders, H, having small openings or tubes $h$ in the bottoms, are formed with or secured in the top of the frame; or a detachable rack or series of water-holders may be employed. The water is poured upon the top of the frame, (or supplied separately to the different receptacles in case an open-work top is made to the frame,) and the receptacles convey the water centrally upon the earth in the bags. Care should be taken in watering not to wet the earth sufficiently to injure the bags.

In practicing my invention, any suitable thin paper which will readily rot, partially separate, or fall to pieces when exposed to moisture for some time is employed for the bags. The earth mixed together with fertilizing material is placed in the bags, the bags are arranged in the racks, which are placed in the frames, arranged in tiers to economize space, and located in a warm cellar or other place supplied with fire to heat the air to the desired temperature, the roots, seeds, or cuttings planted in the bags, and the earth sufficiently moistened from time to time. The circulation of air around the bags keeps the earth at the bottom and all around the sides from becoming sufficiently moist to injure the paper, and at the same time, by supplying the water to the center of the earth, it may be kept amply moist around the roots, seeds, &c.

When the plants have attained a proper growth, and the season admits, they are removed in the bags and racks to the place where they are to be planted, and placed with the bags and earth surrounding their roots in the ground. The paper partially protects the plants from injury by the sudden contact of the roots and earth around them with the comparatively cold ground, and confines the rich earth in which the plants were raised immediately around the roots.

Among the obvious advantages of my improvement may be mentioned the following: By raising the plants under cover the ravages of insects and birds, so destructive to the seeds and very young plants, are prevented; in cold climates the growth of many weeks is saved; one or more cultivations or weedings of the soil avoided; there is no waste of manure by the absorption of the surrounding ground during the germination and early growth of the plants, as there would be if the seeds, &c., were planted directly in the ground of the field or garden, and large numbers of plants are easily, quickly, and properly supplied with water.

It is obvious that modifications may be made in the construction of the frames, racks, &c., without departing from the spirit of my invention, the essential characteristics of which are the planting of seeds, &c., in earth contained in paper bags, hastening germination, and forcing the growth of the plants by artificial heat, moistening the earth in the bags in such manner as not to wet and injure the paper, and finally transplanting the plants with the earth and bags intact.

I am aware that it is not new to raise, start, or force the growth of plants in baskets or similar open-work receptacles containing earth and composed of perishable material, and then to transplant the plants with the receptacles and the earth contained therein, efforts in this direction having heretofore been made; and, therefore, I do not broadly claim raising the plants in receptacles which readily decompose in the earth, and transplanting them with said receptacles. I am not aware, and do not believe, that prior to my invention the herein-described method of raising the plants, watering them, and hastening germination, and keeping dry and preserving the paper bags or perishable receptacles preparatory to transplanting by the circulation of warm air, had ever been known; and, therefore,

I claim as my invention—

1. The hereinbefore-described method of raising and transplanting plants, which consists in planting roots, seeds, &c., in earth contained in a series of paper bags, moistening the earth in the bags simultaneously by water supplied centrally thereto, hastening germination, forcing the growth of the plants, and preventing injury to the bags by the circulation of warm air about the outsides of the bags, and finally transplanting the plants with the bags and earth about the roots.

2. The combination, substantially as hereinbefore set forth, of a rack for holding and separating the bags, an open-bottomed frame, in which the rack is supported, and water holders or receptacles for supplying water centrally to the earth in the bags.

3. The frame, constructed as described, with an open end, an open bottom, and a closed top provided with the series of water-holders.

In testimony whereof I have hereunto subscribed my name.

CONRAD LOSKAMP.

Witnesses:
J. N. WEED,
JAMES MITCHELL.